(12) United States Patent
Pilkauskas et al.

(10) Patent No.: US 11,606,439 B2
(45) Date of Patent: *Mar. 14, 2023

(54) EXIT NODE BENCHMARK FEATURE

(71) Applicant: Oxylabs, UAB, Vilnius (LT)

(72) Inventors: Valdas Pilkauskas, Vilnius (LT); Miroslav Kozlovski, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,351

(22) Filed: Jul. 1, 2022

(65) Prior Publication Data
US 2022/0337670 A1  Oct. 20, 2022

Related U.S. Application Data

(63) Continuation of application No. 17/656,007, filed on Mar. 23, 2022, now Pat. No. 11,412,062, which is a continuation of application No. 17/402,748, filed on Aug. 16, 2021, now Pat. No. 11,316,948, which is a continuation of application No. 17/098,167, filed on Nov. 13, 2020, now Pat. No. 11,140,238, which is a continuation of application No. 16/912,053, filed on Jun. 25, 2020, now Pat. No. 10,873,647.

(51) Int. Cl.
*H04L 67/288* (2022.01)
*H04L 43/50* (2022.01)

(52) U.S. Cl.
CPC ............ *H04L 67/288* (2013.01); *H04L 43/50* (2013.01)

(58) Field of Classification Search
CPC .............................. H04L 67/288; H04L 43/50
See application file for complete search history.

(56) References Cited

U.S. PATENT DOCUMENTS

| | | |
|---|---|---|
| 6,601,098 B1 | 7/2003 | Case et al. |
| 6,658,463 B1 | 12/2003 | Dillon et al. |
| 6,829,638 B1 * | 12/2004 | McBrearty .......... H04L 67/1008 709/219 |
| 6,892,235 B1 | 5/2005 | Daude et al. |
| 7,353,279 B2 * | 4/2008 | Durvasula ............. H04L 47/824 709/227 |
| 7,464,123 B2 | 12/2008 | Croker |
| 7,639,682 B2 | 12/2009 | Suzuki et al. |
| 9,241,044 B2 | 1/2016 | Shribman et al. |
| 10,439,925 B2 * | 10/2019 | Jones ..................... H04L 63/02 |
| 10,985,934 B2 | 4/2021 | Shribman et al. |
| 2002/0069241 A1 * | 6/2002 | Narlikar ................... H04L 9/40 709/225 |
| 2003/0120805 A1 | 6/2003 | Couts et al. |
| 2004/0006615 A1 | 1/2004 | Jackson |
| 2007/0160072 A1 | 7/2007 | Thalanany et al. |
| 2008/0225710 A1 | 9/2008 | Raja et al. |

(Continued)

*Primary Examiner* — Abdullahi E Salad
(74) *Attorney, Agent, or Firm* — FisherBroyles, LLP; Keats Quinalty

(57) ABSTRACT

Systems and methods for effectively managing exit nodes are provided. The exemplary systems and methods use a Supernode to examine an Exit Node through sending and receiving a request to a Target. Information about the exit node is then stored into the Supernode. According to the information provided from the Supernode, the Exit Nodes Database systemizes the proxies according to availability and provides available exit nodes to a User Device.

19 Claims, 4 Drawing Sheets

(56) References Cited

U.S. PATENT DOCUMENTS

| | | | |
|---|---|---|---|
| 2009/0207752 A1* | 8/2009 | Bugenhagen | H04L 47/801 |
| | | | 370/252 |
| 2009/0228603 A1* | 9/2009 | Ritzau | H04L 67/288 |
| | | | 709/238 |
| 2012/0059934 A1 | 3/2012 | Rafiq et al. | |
| 2012/0290527 A1* | 11/2012 | Yalamanchilli | G06F 16/254 |
| | | | 707/602 |
| 2014/0013001 A1 | 1/2014 | Cox et al. | |
| 2016/0127440 A1* | 5/2016 | Gordon | H04L 65/75 |
| | | | 709/219 |
| 2016/0205557 A1 | 7/2016 | Tuupola et al. | |
| 2016/0380778 A1 | 12/2016 | Shen et al. | |
| 2017/0099658 A1 | 4/2017 | Shattil | |
| 2017/0118313 A1 | 4/2017 | Aladdin et al. | |
| 2017/0155623 A1 | 6/2017 | Smith et al. | |
| 2018/0302292 A1* | 10/2018 | Khurana | H04L 43/50 |
| 2020/0136890 A1 | 4/2020 | To et al. | |
| 2020/0145919 A1 | 5/2020 | Jung et al. | |
| 2020/0205058 A1 | 6/2020 | Yoshikawa | |
| 2021/0029080 A1 | 1/2021 | Shribman et al. | |
| 2021/0234719 A1 | 7/2021 | Shribman et al. | |

* cited by examiner

EXIT NODE BENCHMARK FEATURE

The present application is a continuation of U.S. patent application Ser. No. 17/656,007, filed Mar. 23, 2022, which is a continuation of U.S. patent application Ser. No. 17/402,748, filed Aug. 16, 2021, which issued as U.S. Pat. No. 11,316,948 on Apr. 26, 2022, which is a continuation of U.S. patent application Ser. No. 17/098,167, filed Nov. 13, 2020, which issued as U.S. Pat. No. 11,140,238 on Oct. 5, 2021, which is a continuation of U.S. patent application Ser. No. 16/912,053, filed Jun. 25, 2020, which issued as U.S. Pat. No. 10,873,647 on Dec. 2, 2020, the contents of each of which are incorporated herein by reference in their entirety.

The present exemplary embodiments relate to transmission of signals having been supplied in digital form and includes data transmission from a Supernode to a Target using an Exit Node. In one aspect, the present disclosure generally relates to network communications, and more particularly to network communications via a proxy server.

The disclosure provides exemplary systems and method to check the quality of exit nodes in the proxy server and improve the quality of proxy infrastructure. In the exemplary embodiments, the proxy server is a server application or appliance that acts as an intermediary for requests from clients seeking resources from servers that provide those resources. A proxy server thus functions on behalf of the client when requesting service, potentially masking the true origin of the request to the resource server. Instead of connecting directly to a server that can provide the requested resource, such as a file or a web page for example, the client directs the request to the proxy server, which evaluates the request and performs the required network transactions. This serves as a method to simplify or control the complexity of the request, and/or provide additional benefits such as load balancing, privacy, or security.

Proxy servers can perform several functions to increase data security and network performance, including acting as a firewall and web filter, provide shared network connections, and cache data to speed up common requests. Proxy servers can provide a high level of privacy. Proxy servers can change the IP address and other identifying information the web request contains (e.g., so that the destination server does not know who made the original request). Proxy servers can also be used to control internet usage of employees and children (e.g., organizations and parents can set up proxy servers to control and monitor how their employees or kids use the Internet) or improve browsing speeds and save bandwidth (e.g., proxy servers can cache, i.e. save a copy of the appropriate website data locally and when the requested content is available locally, the original request is served from the local copy).

Proxies can be used to bypass certain Internet restrictions (e.g. firewalls) by enabling a user to request content through a (remote) proxy server instead of accessing the content directly. Proxy servers are often used to get around geo-IP based content restrictions. If someone wants to get content from a United States (US) webpage that they are not allowed to access from their home country, the request can go through a proxy server that is located in the US, thus operating from a US IP address space. Using proxy services, the user's traffic seems to be coming from the US IP address. Proxies can also be used for web scraping, data mining, and other similar tasks.

Using a proxy server makes it more difficult to trace Internet activity back to the user, including: visits to websites, online posts, instant messages, and other communication forms. In one aspect, an intended use of proxy servers is to protect the personal privacy of users, as well as their freedom and ability to conduct confidential communication by keeping their Internet activities unmonitored.

A proxy server (a computer system or an application) connection by a client acts as an intermediary for requests from clients seeking resources from other servers. A client connects to the proxy server, requesting some service, such as a file, a connection, a web page, or other resources available from a different server. The proxy server evaluates the request for content and forwards the request to the actual target system or systems containing the corresponding content. After obtaining the content, the proxy server normally forwards the content to the original requestor, but other actions can also be performed by the proxy (e.g., return error message, etc.). Depending on the type of request, a proxy server may or may not have full visibility into the actual content fetched to the original requestor, e.g., in case of an encrypted Hypertext Transfer Protocol Secure (HTTPS) session, the proxy may serve as an intermediary, blindly forwarding the data without being aware of what is being forwarded.

The proxies can be divided into different types depending on what functions are provided or what servers are used. The proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi. A proxy server is basically a computer on the internet with its own IP address that the client's computer knows. When a client sends a web request, the request goes to the proxy server first. The proxy server then makes the web request on the client's behalf, collects the response from the web server, and forwards the web page data so that the client can see the page in the browser. When the proxy server forwards the web requests, the proxy server can make changes to the data but yet provide the data requested. A proxy server changes the client's IP address, so the web server is not provided the geographical location of the client. A proxy can encrypt the client's data so that the client's data becomes unreadable in transit. Also, a proxy server can block access to certain web pages, based on IP address, domain name, or the communication protocol parameters, such as the port requested.

A proxy provider can control the quality of proxies and decide which Internet Protocol (IP) addresses are going to be served by a set of proxies used by clients. If the same proxy is used for too many requests, the proxy will ultimately be banned by the Internet service provider or the web page and it will not be possible to use such a proxy to make subsequent requests. If too many requests come in from one IP address in a short period of time, then the site will return some sort of error message and disallow the requests from that proxy for a pre-set period of time. To prevent errors or disallowed requests, the proxies are checked from time to time by the service provider and corrupted proxies are removed from the proxy pool (such proxies are not provided to the client anymore). The service provider can check proxies on several different grounds: if proxy is online, what is the delay time, what Internet connection proxy uses (Wi-Fi, mobile data, etc.). The examination of a proxy is performed in scheduled time intervals to ensure that the clients, using the proxy services, could use the proxy efficiently.

Exit node proxies, or simply exit nodes, are gateways where encrypted traffic hits the Internet, or are proxies, and through these proxies the request from the user (or the entry node) reaches the Internet. There can be several proxies used to perform a user's request, but exit node proxy is the final proxy that contacts the target and forwards the information from the target to the queue to reach the user. There can be several proxies serving the user's request, forming a proxy chain, passing the request through each proxy in the linear sequence, with the exit node being the last link in the chain that ultimately passes the request to the Target, as well as transfers the reply back to the User through the original chain of proxies.

In the current embodiments proxies and exit nodes can be used as the synonyms. The current embodiments are not limited only to the exit nodes and same technologies can be used for proxies of different types. However, the term exit node is employed in the current description to clarify the functional differences between exit nodes and proxies.

A proxy check can be performed in different ways, including, for example, the proxy checked by the user itself, the proxy checked by the service provider supplying proxies to the user, etc. The inspection of proxies helps to ensure that the proxy is alive or otherwise online, determine the delay time of the proxy, ensure that the proxy can process internet requests to the target, and any other relevant information about the proxy. The problem arises however, that all the information about the proxy is stored within the proxy (or exit node) itself.

Inherently the exit node device is external to the proxy service provider infrastructure, usually belonging to a private customer e.g. a smartphone, a computer, a TV, or another Internet-enabled electronic device. Due to the limitation implied by privacy protection requirements the proxy service provider may not interfere with the configuration settings enabled on such devices. Instead the service provider must confer to using the residential proxies as is, even if it means using an exit node that might be operated by a malicious party or be a misconfigured device. Performing a preliminary benchmark test, controlled and carefully assembled by the service provider to examine the parameters of the exit node functioning relevant in real life scenarios, the service provider can ensure fit-for-purpose exit-nodes delivered to customers.

Therefore, the user or the service provider cannot guarantee that the information about the availability of the proxy provided by the proxy itself is accurate. The proxy may report information that has been meddled with or is inaccurate—for example, it can give untrue information about proxy status, about the internet connection used (mobile or Wi-Fi), provide false IP address, provide uncertain information about round trip time or availability of the proxy.

A proxy can also create a lot of connections from a single device and receive a lot of traffic from the users. The users may be misleadingly informed that the device is available for proxy services, however, due to the high traffic, the proxy is not capable of performing the requests properly and either does not reach the target, or the response time increases, sometimes to a great extent.

The service provider, offering proxies, may not be certain whether the exit node can be used for proxying, or whether the exit node can be used for proxying on a specific target or for a specific geolocation. Problems can arise where service providers are not aware if exit node proxying speed on a specific target or a concrete geolocation is sufficient.

To solve at least these problems, in one aspect, the present embodiments detailed herein perform an exit node (a proxy) check at the service provider's side. Where checks have been previously performed by the exit node (the proxy) itself, and all information about its availability have been stored in the proxy, in contrast, the present embodiments present a method of performing analysis and storing information about the exit node (the proxy) at the service provider's infrastructure instead of holding the information merely in the proxy.

In one aspect, the present embodiments periodically check the exit nodes (proxies), with checks being initiated and performed by the service provider. The exit node is connected to a supernode. At a scheduled time interval, a supernode sends benchmark requests to predefined targets through an exit node. On receiving the reply to the benchmark request, the supernode adds the benchmark results (request delay time, reply if the target was reached, etc.) to the exit node's metadata kept within the exit nodes database.

If the exit node benchmark speed against a specific target meets certain criteria, then the exit node is indicated as suitable for proxying. It is then stored in groups for random proxying, proxying on specific geo location, and/or proxying on specific target. Otherwise, the exit node is not used for random proxying or proxying on a specific location or target. The solution can be implemented in a supernode service that is on the service provider's side.

The present embodiments solve at least some of the following problems: 1) increasing service quality for user requests due to exit node availability; 2) selecting appropriate exit node(s) according to the target or geographical location of the request; and/or 3) increasing the speed for fetching the data requested to a user device.

DETAILED DESCRIPTION

Figure 1:
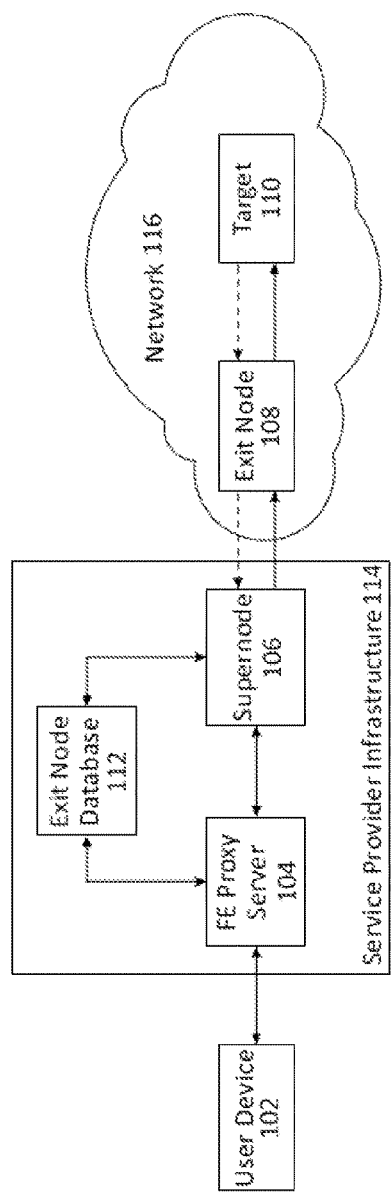
FIG. 1 is a block diagram of an exemplary architectural depiction of components.

Some general terminology descriptions may be helpful and are included herein for convenience and are intended to be interpreted in the broadest possible interpretation.

User Device—where a user can be any person or a business entity requesting and using proxies for the purpose of obtaining relevant information from the Web (e.g., for the purpose of collecting information, scraping websites, etc.), a User Device can be any device that is capable of making requests to the proxy, including any physical device that is connected to a network; including, for example, a laptop, a mobile phone, a tablet computer, or any other smart device.

Front-end Proxy server or FE Proxy—a proxy, typically a forward proxy, or a gateway, providing client-facing interface to the Proxy services for a client or a group of clients. The primary function of a Front-End Proxy server is to receive the requests from a client, or multiple clients, and to pass the request to the infrastructure that executes the function of transmitting the user's request to the actual target through the exit-node, or multiple exit-nodes, selected for the task. Front-End Proxy may be running data caching services and serve the client with the data stored in a local cache in case the cached data is precisely the data requested by the user, in order to control the bandwidth utilization at the exit node.

Supernode—a computing device within service provider infrastructure relayer for a particular network that contains multiple exit-nodes. This semi-distributed architecture allows data to be decentralized, thus reducing the processing overhead from exit nodes.

Exit Node—a proxy that is connected to a network and that is used to reach the Target. The Exit Node can be any proxy device that is connected to the Network, for example, a laptop, a mobile phone, a tablet computer, or any other smart device. A proxy service provider may be operating a multitude of exit-nodes.

Target or Target server— a server serving any kind of content accessible over multiple protocols over the Internet. A Target can be, for example, a particular IP address, a domain name, and/or a hostname, possibly with a defined network protocol port, that represent(s) a resource address at a remote system serving the content accessible through industry standard protocols.

Exit Nodes Database—a data structure e.g. a database, or a file, that contains information about exit nodes, including exit node configuration attributes.

Exit Node Metadata—information about the exit node, including the exit node configuration settings.

Service Provider Infrastructure—infrastructure of the party providing the proxy as a service to the customer. Service Provider Infrastructure is comprised of at least one or multiple of: FE Proxy Server, Exit Nodes Database and Supernode.

Proxy Service Provider—a party providing the proxying functionality that is delivered to a customer as a service, comprised of the proxies, that act as an intermediary for requests from clients seeking resources from other servers, and the proxy management components. One of the many available typologies for proxy servers being the type of IP address the proxy uses, including but not limited to Residential IPs proxies, Datacenter IP proxies and Mobile IPs proxies.

Network—a digital telecommunications network that allows nodes to share resources. Examples of a network: local-area networks (LANs), wide-area networks (WANs), campus-area networks (CANs), metropolitan-area networks (MANs), home-area networks (HANs), Intranet, Extranet, Internetwork, and Internet.

In one aspect, the present embodiments provide systems and methods for effectively managing Exit Node(s) 108, e.g., by using Supernode 106 to examine the Exit Node 108, including by sending and receiving a request to the Target 110 through the Exit Node that is tested. The information about Exit Node 108, as well as the results of the test, is then stored into the Supernode 106, and aggregated in Exit Node Database 112 by submitting the Exit Node information contained within the Supernode 106, or multiple Supernode devices. According to the information provided by Supernode 108, Exit Nodes Database 112 categorizes the proxies according to their availability and provides available exit nodes to the Front End Proxy 104 that requests available exit nodes to serve the requests of User 102.

In one aspect, the present embodiments describe an exemplary method of Supernode 106 checking the Exit Node(s) 108 and collecting information about its availability status and capabilities. The Exit Node 108 connects to Supernode 106 and remains connected until the Exit Node 108 is disconnected, either by disconnecting itself or where the Supernode 106 disconnects the Exit Node 108 and/or removes the Exit Node 108 from the availability list. More than one Exit Node 108 can be connected to the Supernode 106 at the same time, and more than one Supernode 106 can work within the same Proxy Service Provider infrastructure 114. The number of Exit Nodes 108 or Supernodes 106 employed in the Service Provider Infrastructure 114 is not limited. The Proxy Service Provider can have an unlimited number of Supernodes 108 to which an unlimited number of Exit nodes 108 can be connected, including at the same time.

Benchmark test definitions generally are described at the Supernode 106 locally, and, in some embodiments, may be a configuration file or multiple files, or the description can be placed on a different platform altogether, e.g., a 3rd party service or data storage platform. A benchmark test definition may include a target specification e.g. target's geographical location, Network placement, country affiliation, communication protocol type or any other characteristic deemed relevant by the Service provider. Once the Exit Node 108 connects to Supernode 106, the Supernode 106 forms a benchmark request according to a benchmark test definition and sends a benchmark request 204 to the Exit Node 108 (see FIG. 2). The benchmark request can be a request to reach any specific Target 110, e.g., an IP address, a hostname, an application level protocol link, e.g., HTTP, or any other type of Target 110 on the Network 116. The Network 116 can be any computer network, but, typically, is the Internet.

In one exemplary embodiment, the benchmark targets are changed dynamically according to the results of analyzing customer requests that are monitored, registered, and aggregated by the Proxy Service Provider. Such analysis of customer requests may be performed against the data for a specific period of time in order, for example, to reveal the target or targets currently most in demand. The list of the targets then may be used while dynamically defining the benchmark requests against particular targets. The resultant responses are consequently employed for categorizing exit nodes in pools corresponding to the potential targets.

In at least one embodiment, the Exit Node 108, Supernode 106, and Front End Proxy 104 are parts of the Service Provider Infrastructure 114.

FIG. 1 shows an exemplary overall structure that comprises User device 102, which can be any computing device (e.g., a personal computer, mobile phone, a tablet computer) having access (e.g. Internet connection) to a particular network, Service Provider Infrastructure 114, which contains Front End Proxy server 104, Exit Nodes Database 112, Supernode 106, and Exit Node 108. Exit Node 108 and Target 110 are based in Network 116 and, generally, not in Service Provider Infrastructure 114. While the elements shown in the FIG. 1 implement the exemplary embodiment, some elements in other embodiments can have different titles or can be combined into a single element instead of two separate elements (for example, Exit Nodes Database 112 can be combined with Front End Proxy Server 104 as a single infrastructure component). However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure herewithin.

The Supernode performs the next actions and evaluates if: 1) the response was received; 2) Exit node is available (is online); 3) Exit Node can reach a specific target; 4) the reply was speedy enough, as compared to the quality threshold defined for the Proxy Service Provider to use the Exit Node. For example, if the delay time to reach the Target is longer than 5 seconds, the Exit node may be marked as not available. Successful evaluation of the abovementioned factors specifies the adequate exit node performance. According to the evaluations, the Supernode 106 sends all information about each Exit Node 108 that was checked, to the Exit Nodes Database 112 (step 212).

In at least one embodiment, the Exit Node(s) 108 is/are subjected to a benchmark test as part of the initial registration with the service provider, the Exit Nodes are then placed into pools, or groups, corresponding to the results of the benchmark test e.g. according to the network bandwidth deduced from the reply time.

As long as the Exit Node(s) 108 adequately services requests, further benchmark tests are typically not performed against the Exit Node(s) 108. However, as soon as the replies delivered by an Exit Node 108 indicate that the Exit Node 108 is not performing correctly, the Exit Node is temporarily removed from circulation, i.e., customer requests are not sent to such Exit Node 108. Potential signs of an erroneous response, in one example, may demonstrate a drastic reduction in the size of a typical reply, e.g. 400 Kbytes reduced to 50 Kbytes, which might indicate that the response contains no appropriate data, instead delivering the error message e.g. designated by HTTP error code 4(xx) group, from the Target.

Removed Exit Node(s) 108 can subsequently be subjected to further benchmark tests according to a pre-configured schedule or after a preset timeout period has lapsed. If the reply to a subsequent or further benchmark test matches the criteria of an adequate reply, the Exit Node(s) 108 is put back into circulation for use. Otherwise, the exit node stays out of circulation and may be subjected to repeated benchmark tests, which can include increased or varied time period(s) between such tests.

In one aspect, the process or sequence of benchmark tests ensures use in a targeted fashion i.e. the whole exit node population is not subjected to a wide-scale network connection and processing load, therefore preserving the infrastructure resources of the service provider. Properly working exit nodes are not overloaded with benchmark requests, instead dedicating the full capacity of the Exit Node(s) 108 to serving the requests from the service users.

After the Exit Node(s) 108 is successfully registered in Exit Nodes Database 112, the Exit Nodes Database 112 provides the Front End Proxy Server 104 with the available Exit Node 108. Only Exit Nodes 108 that are checked by the Supernode 106, and that have been proved to be ready for use, are provided to Front End Proxy Server 104. Once the User Device 102 makes a request to the Front End Proxy 104 (step 218), the Front End Proxy Server 104 selects the Exit Node 108 from the list of available Exit Nodes 108 in the Exit Nodes Database 112, and provides User Device 102 with the best Exit Node(s) 108 (step 220) for further processing of the requests from the User Device 102. In this way, the User Device 102 receives the best results for its further data scraping requests.

Figure 2:
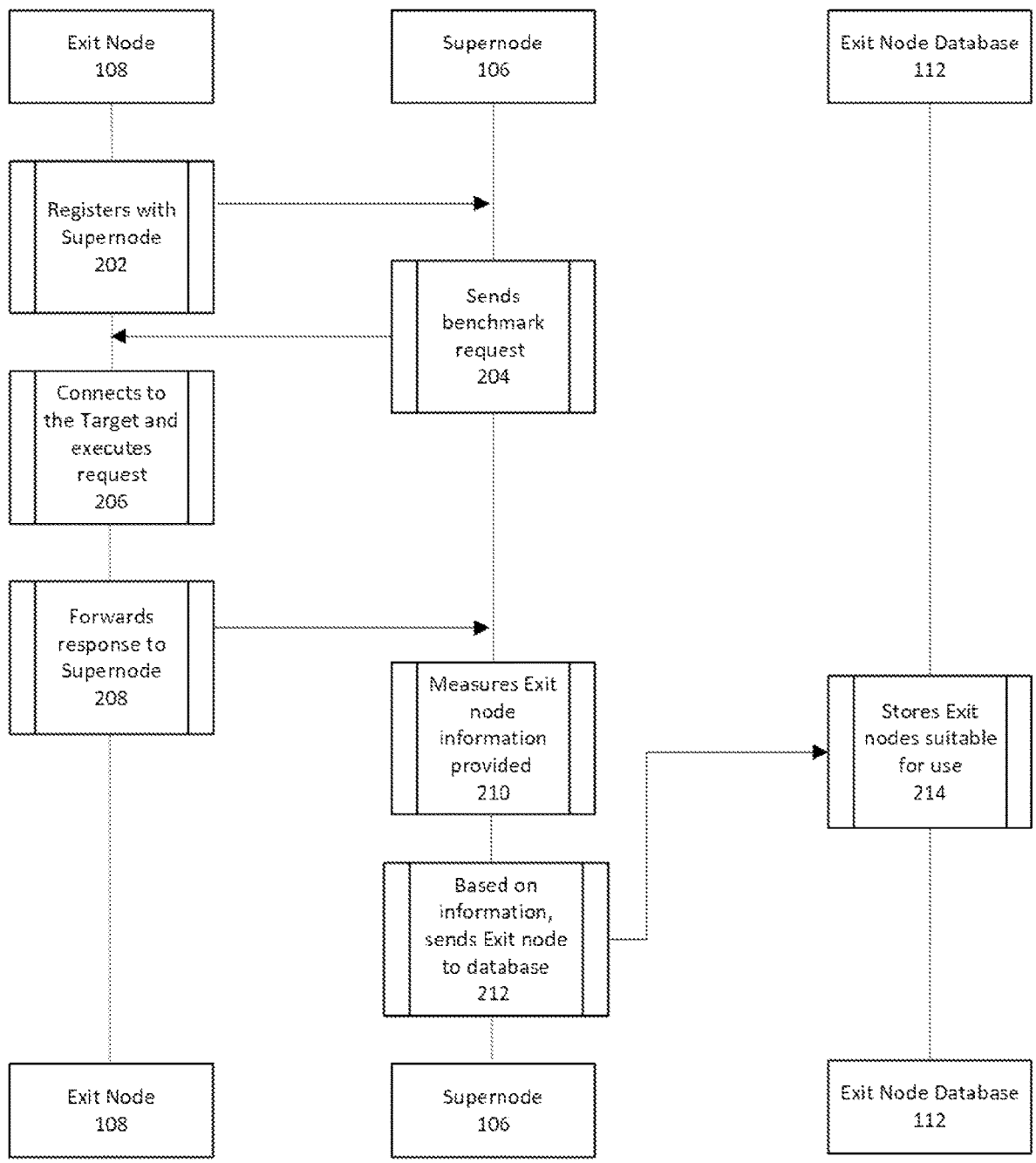
FIG. 2 is an exemplary test flow diagram.

FIG. 2 presents a flow diagram showing an exemplary process of operation of information travel between elements and exemplary functions the elements perform. Exit Node 108 connects to Supernode 106 to register with the Supernode 106 (step 202). Supernode 106 next sends a benchmark request to the Exit Node 108 (step 204). Exit Node 108 connects to a Target and executes a request (step 206). Then, the Exit Node 108 forwards a response to the Request to Supernode 106 (step 208). Supernode 106 measures the information provided by the Exit Node 108 (step 210). The Supernode 106 evaluates if: 1) the response was received; 2) Exit Node 108 is available (is online); 3) Exit Node 108 can reach a specific target; 4) the reply was speedy enough to use the Exit Node 108. For example, if the delay time to reach the Target is longer than 5 seconds, the Exit Node 108 may be marked as not available. Based on the information provided by the Exit Node 108, the Supernode 106 sends the information about Exit Node 108 to the Exit Nodes Database 112 (step 212). In the Exit Nodes Database 112, the Exit Nodes 108 are grouped, e.g., as Exit Nodes that can be used and Exit Nodes 108 that are not available for use, by placing them in the corresponding Exit Node pools, or groups, within the Exit Node Database. The Exit Node(s) 108 can also be grouped by categories of Exit Node(s) 108 being used to reach specific targets (e.g., concrete marketplaces, channels, http links) or to reach specific geolocation (e.g., the USA, Germany, Australia), or into other groupings.

These steps of measuring Exit Node(s) 108 can be performed at any relevant or scheduled time interval(s), for example, the time interval(s) can be set as every second to a few minutes. These time intervals(s) depend on the amount of Exit Nodes 108 connected to the Supernode 106, e.g., if more Exit Nodes 108 are connected, more time will be required for the Supernode 106 to send benchmark requests to each Exit Node 108. If less Exit Nodes 108 are attached to a particular Supernode 106, the Supernode 106 may send benchmark requests more often. The status of the Exit Node(s) 108 can change quickly, e.g., if a device operating as an Exit Node 108 is switched off, loses Internet connection, oversaturates its connection at a particular time of day causing delay in response time, or due to overall increases of network bandwidth usage at a particular provider. For example, a channel with a particular amount of Bits Per Second (BPS) may not necessarily transmit data at a particular rate, since protocols, encryption, and/or other factors can add appreciable overhead. For instance, a large amount of internet traffic uses Transmission Control Protocol (TCP), which requires a three-way handshake for each transaction. Although in many modern implementations the protocol is efficient, TCP can add significant overhead compared to other protocols. Also, data packets may be lost and need to be re-sent, which further reduces useful data throughput.

Figure 3:
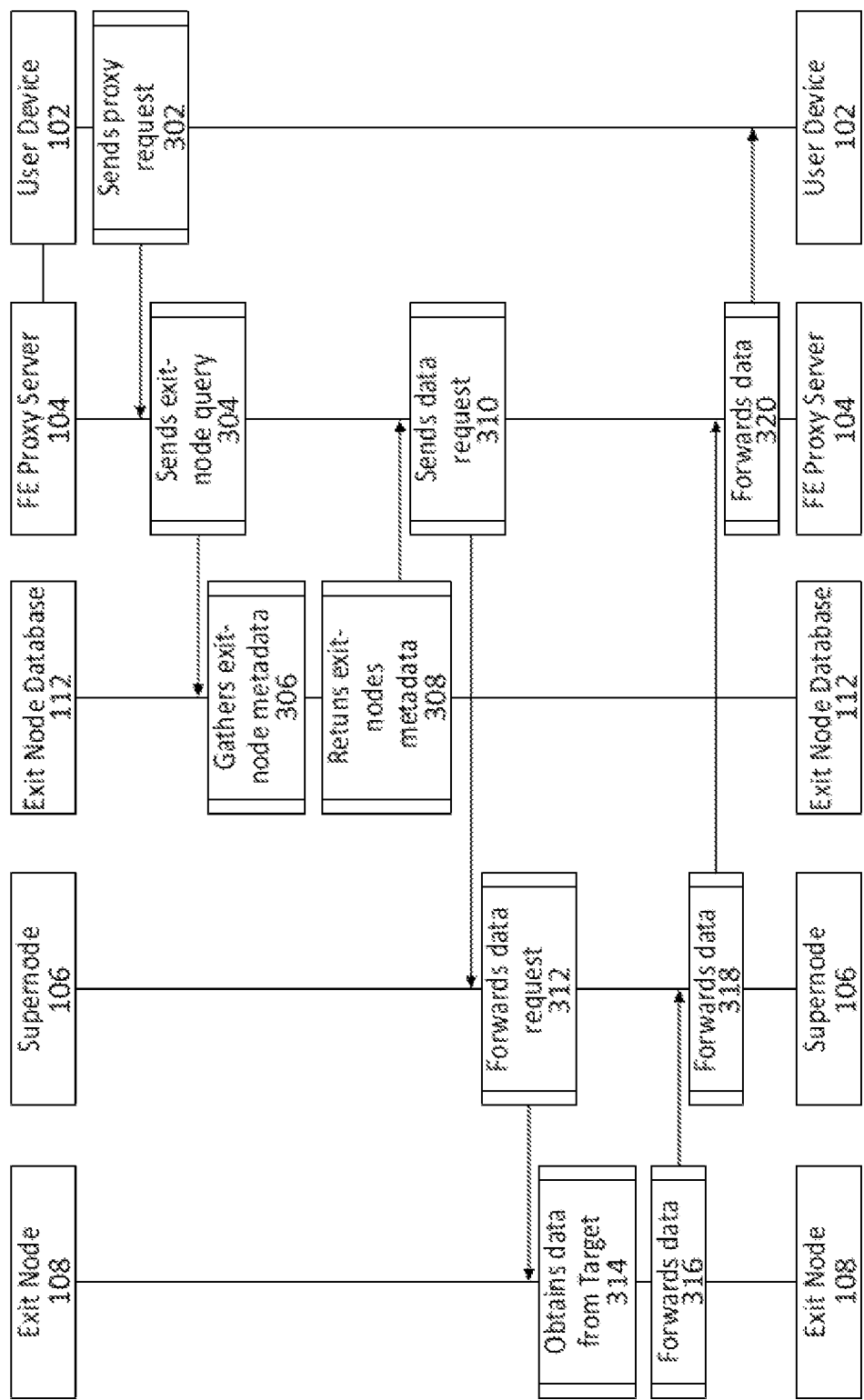
FIG. 3 is an exemplary scraping flow diagram.

FIG. 3 presents an exemplary flow diagram of a user's requesting to scrape a particular Target. Front End Proxy server 104 receives a request for a proxy from a User Device 102 (step 302), with the request containing the necessary attributes the User Device 102 requires. Then, Front End Proxy Server 104 forms a query for the Exit Node, or multiple Exit-Nodes, conforming to the requirements of the User Device 102, and communicates the query to the Exit Node Database 112 (step 304). The Exit Node Database 112 forms the list of exit-nodes appropriate to the request, collects the Exit Node Metadata (step 306) and returns the Exit Node Metadata to the Front End Proxy Server 104 (step 308). Front End Proxy Server 104 next sends the data request to the Supernode 106 (step 310). On receiving the request, Supernode 106 forwards the data request to the Exit Node 108 (step 312). Exit Node 108 implements the request and obtains data from the indicated Target (step 314). After obtaining the data, Exit Node 108 forwards the data to the Supernode (step 316). Once Supernode 106 receives the data from the Exit Node 108, Supernode 106 also collects qualitative information about the exit node servicing that particular request. Should the exit node perform adequately corresponding to the thresholds configured by the Proxy Service configuration settings (e.g. response time less or equal to 5 sec, HTTP response code 2xx), the Exit Node 108 is marked as suitable for use. Timely response and the HTTP return code (e.g. 2xx) constitute adequate performance. Otherwise, the Exit Node 108 is acknowledged for benchmark testing. The statistical information about the quality of the Exit Node 108 functioning is stored within the Exit Node Database 112. As the next step, the Supernode 106 forwards the data obtained from the Target to the Front End Proxy Server 104 (318). Front End Proxy Server 104 forwards the data obtained from the Target to the User Device 102 (step 320).

As a further example, the User Device 102 could send a second request to the Front End Proxy Server 104. The second request can differ from the first request regarding the Target, e.g., the second request can be related to a specific country. As for the second request, the Front End Proxy Server 104 provides the User Device 102 with the second Exit Node 108 from the most suitable Exit Node(s) 108 stored in the Exit Nodes Database 112. As an example, in a first request, a User Device 102 might ask for an exit node to reach a target (e.g., www.e-shop.com). For the first request, the Front End Proxy Server 104 provides the User Device 102 Exit Node "A", that is the best suitable to reach a specifically indicated marketplace. For a second request, the User Device 102 might ask for an exit node operating in the US (e.g., having a US IP address). For the second request, Front End Proxy Server 104 provides the User Device 102 with a second Exit Node that conforms to the requirements of the User Device 102 (e.g., an Exit Node that is registered in the US). However, if the exit node that was used to perform the first request also conforms to the requirements of the second request, the same exit node could be used twice.

The various embodiments described herein provide checking Exit Nodes at the Supernode side instead of the Exit Nodes, in at least one aspect to address shortcomings of possible failures of Exit Nodes. Checking of Exit Nodes is based on dynamic updates received from the Exit Node itself using different Targets, and not based on the information provided only by the Exit Node. The methods of the exemplary embodiments detailed herewithin allow the user to be provided only active and ready to use Exit Nodes to perform a request.

Figure 4:
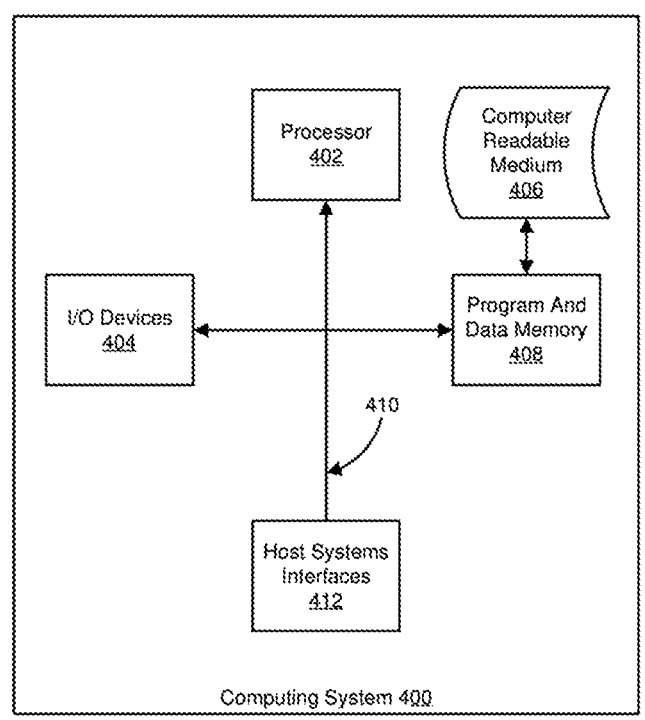
FIG. 4 is an exemplary computing system performing the methods disclosed.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 4 illustrates a computing system 400 in which a computer readable medium 406 may provide instructions for performing any of the methods disclosed herein.

Furthermore, the embodiments can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk— read/write (CD-R/W) and digital versatile disc (DVD).

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the clients, requests performed, networks used, proxies used, types of proxies requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Thus this application discloses a computer-implemented method of checking capabilities and availability of proxy servers comprising at least the following steps:
Connecting, by an Exit Node, to a Supernode;
Sending by the Supernode a benchmark request to the Exit Node;
Implementing by the Exit Node the benchmark request;
Sending by the Exit Node to the Supernode a response for the benchmark request;
Measuring by the Supernode an Exit Node response quality;
Storing by a Supernode, Exit Node Metadata, together with the response quality measurements to the Exit Node Database.

The indicated benchmark targets are changed dynamically according to results of analyzing a customer's request as monitored, registered, and aggregated by a Service Provider Infrastructure.

The benchmark request target is a resource submitted to the Exit Node as an IP address or URL/URI. The measuring of the Exit Node response identifies whether the Exit Node can be indicated as suitable for proxying or not suitable for proxying. The Exit Node indicated as suitable for proxying can be stored in exit node groups categorizing as random proxying, proxying on specific geo location, proxying on specific target, or any combination thereof.

The response of the Exit Node, received from performing a benchmark request by that Exit Node, is stored in the Supernode.

The number of the Exit Nodes connected to the Supernode at the same time is unlimited.

The benchmark request is applied to the Exit Node during the initial registration of the Exit Node with the Service Provider Infrastructure or is applied to an Exit node that has been previously registered and stored in the Exit-Node Database and is exhibiting performance inadequate corresponding to the thresholds configured at the Service Provider Infrastructure.

The current embodiments disclose a system of checking availability of proxy servers comprising at least:
a Service Provider Infrastructure, comprised of:
a Front End Proxy Server,
an Exit Nodes Database,
a Supernode; and,
an Exit Node.

The availability of the Exit Node is evaluated by initiating a benchmark test request to targets through the Exit Node tested, where targets are changed dynamically according to results of analyzing a customer's previous request as registered by the Service Provider Infrastructure.

The Exit Node is registered in Exit Node Database as categorized as suitable for random proxying, proxying of specific geo location, proxying of a specific target, or not suitable for proxying. The Exit Node Database stores a response of the Exit Node from a benchmark request as well as results of customer's previous request.

The Supernode applies benchmark requests to the Exit Node during the initial registration process or to an Exit node that has been previously registered and stored in the Exit-Node Database and is exhibiting performance inadequate corresponding to thresholds configured at the Service Provider Infrastructure.

The current embodiments present a non-transitory computer readable medium for checking availability of proxy servers comprising instructions which, when executed by a computing device within a Service Provider Infrastructure, cause the corresponding computing device to:
Accept, by a Supernode, a connection from an Exit Node;
Send, by a Supernode, a benchmark request to the Exit Node;
Accept, by a Supernode, from the Exit Node a response to the benchmark request;
Measures, by the Supernode, an Exit Node response quality;
Store, by a Supernode, Exit Node Metadata, together with the response quality measurements to the Exit Node Database;
Compare, by the Exit Node Database, the benchmark response quality measurements to the quality thresholds configured;
Place, by the Exit Node Database, the Exit Node in a corresponding group based on the Exit Node metadata and a quality of the response provided by the Exit Node;
Provide, by the Front End Proxy Server to the User Device, the Exit Node registered in the Exit Node Database.

The non-transitory computer readable medium is described by benchmark targets that are changed dynamically according to results of analyzing a customer's request as monitored, registered, and aggregated by a Proxy Service Provider. The benchmark request is performed against a specific selected target, geolocation, IP address, or HTTP link in a Network.

The Exit Node suitable for proxying is stored in Exit Node Database categorized as intended for random proxying, proxying against a specific geo location, or proxying to a specific target, or any combination thereof, or not suitable for proxying.

The benchmark request is applied to the Exit Node during the initial registration with a Proxy Service Provider or is applied to an Exit Node, already stored in the proxy pool, that has response measurements marked as less than thresholds configured at the Service Provider Infrastructure.

The invention claimed is:

1. A computer implemented method of examining and collecting qualitative information about an exit node comprising:
   receiving, by the exit node, a benchmark request, wherein the exit node is connected to a network, wherein the benchmark request is produced by a service provider infrastructure based on benchmark test definitions;
   connecting, by the exit node, to a target via the network, wherein the exit node upon connecting to the target, forwards the benchmark request to the target;
   receiving, by the exit node, a response to the benchmark request from the target, wherein the exit node, upon receiving the response, forwards the response to a service provider infrastructure, and wherein the service provider infrastructure categorizes the exit node based on the response to the benchmark request.

2. The method of claim 1 further comprising:
   receiving, by the exit node, a data scraping request from the service provider infrastructure, wherein the service provider infrastructure formulates the data scraping request based on a client's request received from a client device;
   implementing, by the exit node, the data scraping request, wherein the exit node upon implementing the data request obtains data from the target via the network;
   forwarding, by the exit node, the data obtained from the target to the service provider infrastructure via the network, wherein the service provider infrastructure collects the qualitative information of the exit node.

3. The method of claim 2, wherein qualitative information about the exit node indicates the service quality of the exit node in servicing the data scraping request.

4. The method of claim 2, wherein the exit node is admitted for suitable use by the service provider infrastructure, when the data forwarded by the exit node is speedy enough when compared to thresholds configured by the service provider infrastructure and comprises appropriate HTTP response codes.

5. The method of claim 2, wherein the exit node is acknowledged for benchmark testing by the service provider infrastructure when the data forwarded by the exit node is not speedy enough when compared to thresholds configured by the service provider infrastructure and does not comprise appropriate HTTP response codes.

6. The method of claim 1, wherein the exit node receives the benchmark request during an initial registration with the service provider infrastructure or when exhibiting performance inadequacy corresponding to thresholds configured by the service provider infrastructure.

7. The method of claim 1, wherein the benchmark test definitions are configuration files described locally at the service provider infrastructure.

8. The method of claim 1, wherein the benchmark test definitions comprise at least one or a combination of: geo-location of the target, network placement, country affiliation, communication protocol type and characteristics deemed to be relevant by the service provider infrastructure.

9. The method of claim 1, wherein the response to the benchmark is evaluated by the service provider infrastructure.

10. The method of claim 1, wherein the service provider infrastructure evaluates at least one or a combination of:
    reception of the response to the benchmark request;
    availability of the exit node;
    ability of the exit node to reach the target.

11. The method of claim 10, wherein the service provider infrastructure evaluates if the reception of the response to the benchmark request is speedy enough when compared to thresholds configured by the service provider infrastructure to use the exit node.

12. The method of claim 1, wherein information on the exit node is sent to a database by the service provider infrastructure.

13. The method of claim 1, where the exit node is grouped according to at least one of these categories within the database: a) availability of the exit node; b) ability of the exit node to reach the target.

14. A non-transitory computer readable medium for examining and collecting qualitative information about an exit node comprising instructions which, when executed by a computing device within a service provider infrastructure, cause the computer readable medium to:
    receive a benchmark request produced by a service provider infrastructure based on benchmark test definitions;
    connect to a target and forward the benchmark request to the target;
    receive a response to the benchmark request from the target;
    forward the response to the service provider infrastructure and wherein the service provider infrastructure categorizes the exit node based on the response to the benchmark request;
    receive a data scraping request formulated by the service provider infrastructure based on a client's request received from a client device;
    implement the data request and obtain data from the target;
    forward the data obtained from the target to the service provider infrastructure, wherein the service provider infrastructure collects qualitative information about the exit node.

15. The non-transitory computer readable medium of claim 14, wherein the benchmark request is received by the exit node.

16. The non-transitory computer readable medium of claim 14, wherein the exit node connects to the target and forwards the benchmark request to the target.

17. The non-transitory computer readable medium of claim 14, wherein the exit node receives the response to the benchmark request from the target.

18. The non-transitory computer readable medium of claim 14, wherein the qualitative information about the exit node indicates the service quality of the exit node in servicing the data scraping request.

19. The non-transitory computer readable medium of claim 14, wherein the benchmark test definitions comprise at least one or a combination of: geo-location of the target, network placement, country affiliation, communication protocol type and characteristics deemed to be relevant by the service provider infrastructure.

* * * * *